(12) United States Patent
Wu

(10) Patent No.: US 8,233,093 B2
(45) Date of Patent: Jul. 31, 2012

(54) AUTOMATIC VIDEO GAIN CONTROL CIRCUIT FOR POSITIVE AND NEGATIVE MODULATION AND METHOD THEREOF

(75) Inventor: Shan-Tsung Wu, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1285 days.

(21) Appl. No.: 11/689,516

(22) Filed: Mar. 22, 2007

(65) Prior Publication Data

US 2008/0122957 A1 May 29, 2008

(30) Foreign Application Priority Data

Nov. 28, 2006 (TW) ................................ 95144006 A

(51) Int. Cl.
  *H04N 5/52* (2006.01)
(52) U.S. Cl. ........ 348/678; 348/679; 348/685; 348/225; 348/471; 348/495; 348/726; 375/345; 375/344; 375/316; 455/240.1; 455/245.1; 455/250.1
(58) Field of Classification Search .................. 348/678, 348/679, 685, 255, 471, 495, 528, 537, 682, 348/727, 638, 639, 641, 726
  See application file for complete search history.

(56) References Cited

U.S. PATENT DOCUMENTS

| | | | | |
|---|---|---|---|---|
| 4,360,929 A * | 11/1982 | Isobe | ........................ | 455/245.1 |
| 4,500,921 A * | 2/1985 | Tomizawa et al. | ............ | 348/678 |
| 4,963,969 A * | 10/1990 | Kitaura et al. | ................ | 348/572 |
| 5,272,531 A * | 12/1993 | McGinn | ......................... | 348/678 |
| 5,422,601 A * | 6/1995 | Kovacs et al. | ................. | 330/279 |
| 5,636,252 A * | 6/1997 | Patel et al. | ..................... | 375/345 |
| 5,680,075 A * | 10/1997 | Sacca | ........................... | 330/279 |
| 5,745,531 A * | 4/1998 | Sawahashi et al. | ........... | 375/345 |
| 5,910,751 A * | 6/1999 | Winn et al. | .................... | 327/560 |
| 6,239,848 B1 * | 5/2001 | Mycynek et al. | ............. | 348/678 |
| 6,430,238 B1 * | 8/2002 | Sutardja | ........................ | 375/345 |
| 6,459,458 B1 * | 10/2002 | Balaban | ........................ | 348/678 |
| 6,480,236 B1 * | 11/2002 | Limberg | ........................ | 348/555 |
| 6,545,728 B1 * | 4/2003 | Patel et al. | ..................... | 348/725 |
| 6,606,358 B1 * | 8/2003 | Sutardja | ........................ | 375/345 |
| 6,668,027 B1 * | 12/2003 | Scarpa | .......................... | 375/345 |
| 7,149,263 B2 * | 12/2006 | Higure | .......................... | 375/345 |
| 2001/0044287 A1 * | 11/2001 | Iwata et al. | ................. | 455/245.1 |
| 2002/0061738 A1 * | 5/2002 | Simmons et al. | .......... | 455/234.1 |
| 2003/0139160 A1 * | 7/2003 | Yang | ........................... | 455/226.1 |
| 2004/0017865 A1 * | 1/2004 | Litwin et al. | .................. | 375/345 |
| 2004/0189382 A1 * | 9/2004 | Dauphinee et al. | ........... | 330/129 |
| 2004/0189393 A1 * | 9/2004 | Nguyen et al. | ................ | 330/279 |

(Continued)

OTHER PUBLICATIONS

Isaac Martinez G., Automatic Gain Control (AGC) Circuits—Theory and Design, Fall 2001, University of Toronto.*

*Primary Examiner* — Jefferey Harold
*Assistant Examiner* — Sam Huang
(74) *Attorney, Agent, or Firm* — Winston Hsu; Scott Margo

(57) ABSTRACT

Disclosed is an automatic video gain control circuit, which includes an analog to digital converter, an envelope detector and an extreme value detector. The analog to digital converter converts an analog video signal to a digital video signal. The envelope detector detects a baseband amplitude signal according to the digital video signal. The extreme value detector generates an extreme value to control RF signal gain.

20 Claims, 8 Drawing Sheets

U.S. PATENT DOCUMENTS

| | | | |
|---|---|---|---|
| 2004/0223086 A1* | 11/2004 | Jaffe | 348/726 |
| 2005/0078586 A1* | 4/2005 | Spielman et al. | 369/59.1 |
| 2005/0200406 A1* | 9/2005 | Dauphinee et al. | 330/129 |
| 2006/0135104 A1* | 6/2006 | Lee et al. | 455/234.1 |
| 2006/0166633 A1* | 7/2006 | Mehr | 455/232.1 |
| 2006/0188042 A1* | 8/2006 | Takatz et al. | 375/345 |
| 2007/0010223 A9* | 1/2007 | Demir et al. | 455/205 |

* cited by examiner

AUTOMATIC VIDEO GAIN CONTROL CIRCUIT FOR POSITIVE AND NEGATIVE MODULATION AND METHOD THEREOF

CROSS-REFERENCE TO RELATED APPLICATIONS

This application claims foreign priority under 35 U.S.C 119(a)-(d), based upon application #095144006 filed on Nov. 28, 2006 in TAIWAN.

BACKGROUND OF THE INVENTION

1. Field of the Invention

The present invention relates to an automatic gain control circuit and a method thereof, and particularly relates to an automatic video gain control circuit for positive and negative modulation and a method thereof.

2. Description of the Prior Art

A digital television system should be capable of decoding digital TV signals complying with standards such as ATSC (Advanced Television Systems Committee, ATSC) or SECAM (Sequential Couleur Avec Memory). Also, a digital television system should be capable of decoding TV signals complying with conventional analog TV system specifications such as NTSC (National Television Standards Committee) and PAL (Phase Alternation Line).

FIG. 1 shows a front-end module of a prior art video system, including a tuner 101 and a demodulator 103. The tuner 101 converts a video radio frequency signal RF to a video intermediate signal VIF, and the demodulator 103 converts the video intermediate signal VIF to a composite video signal CVBS. Normally, the video intermediate signal VIF is in a range 41-46 MHZ for an NTSC specification.

Conventionally, the demodulator 103 performs a sync white detection to control the gain of the radio frequency signal RF. Thus, all white frames are required for gain control. The demodulator 103 will be over-saturated if black frames continuously appear for a period of time. Particularly, a positive modulation or a negative modulation may be applied in a digital TV RF signal. The sync white detection cannot meet requirements for both kinds of modulation. As noted, the sync white detection is easily affected by the video content.

Therefore, an automatic video gain control circuit that will not be affected by video content is needed for various video signal specifications.

SUMMARY OF THE INVENTION

One objective of the present invention is to provide an automatic video gain control circuit and a related method to detect a maximum value, a minimum value, and a height information to perform automatic gain control.

The present invention discloses an automatic video gain control circuit, which comprises an ADC, an envelope detector and an extreme value detector. The ADC converts a modulated IF video signal to a digital video signal. The envelope detector coupled to the ADC generates a baseband amplitude signal. The extreme value detector coupled to the envelope detector generates an extreme value for automatic gain control according to the baseband amplitude signal.

The automatic video gain controlling circuit further comprises a demodulator, a synchronization signal height detector and a multiplexer. The demodulator coupled to the ADC demodulates the digital video signal to generate a demodulated digital video signal. The synchronization signal height detector coupled to the demodulator detects the height of a synchronization signal of the demodulated video signal to generate a height information. The multiplexer, coupled to the extreme value detector and the synchronization signal height detector, selectively outputs the height information or the extreme value information. The automatic video gain controlling circuit further comprises a synchronization signal detector and a second multiplexer. The synchronization signal height detector coupled to the demodulator detects the height of the synchronization signal of the demodulated video signal to generate height information. The second multiplexer coupled to the extreme value detector and the synchronization signal height detector selectively outputs the height information or the extreme value information.

Alternatively, the video automatic gain controlling circuit further comprises a demodulator and a first multiplexer. The demodulator coupled to the ADC demodulates the digital video signal to generate a de-modulated digital video signal. The first multiplexer coupled to the demodulator and the ADC selectively outputs the digital video signal and the demodulated digital video signal to be as the input signal of the envelope detector.

The present invention further discloses an automatic video gain control method, comprising steps of: converting a modulated IF video signal to a digital video signal; generating a baseband amplitude signal; and generating an extreme value for automatic gain control according to the baseband amplitude signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
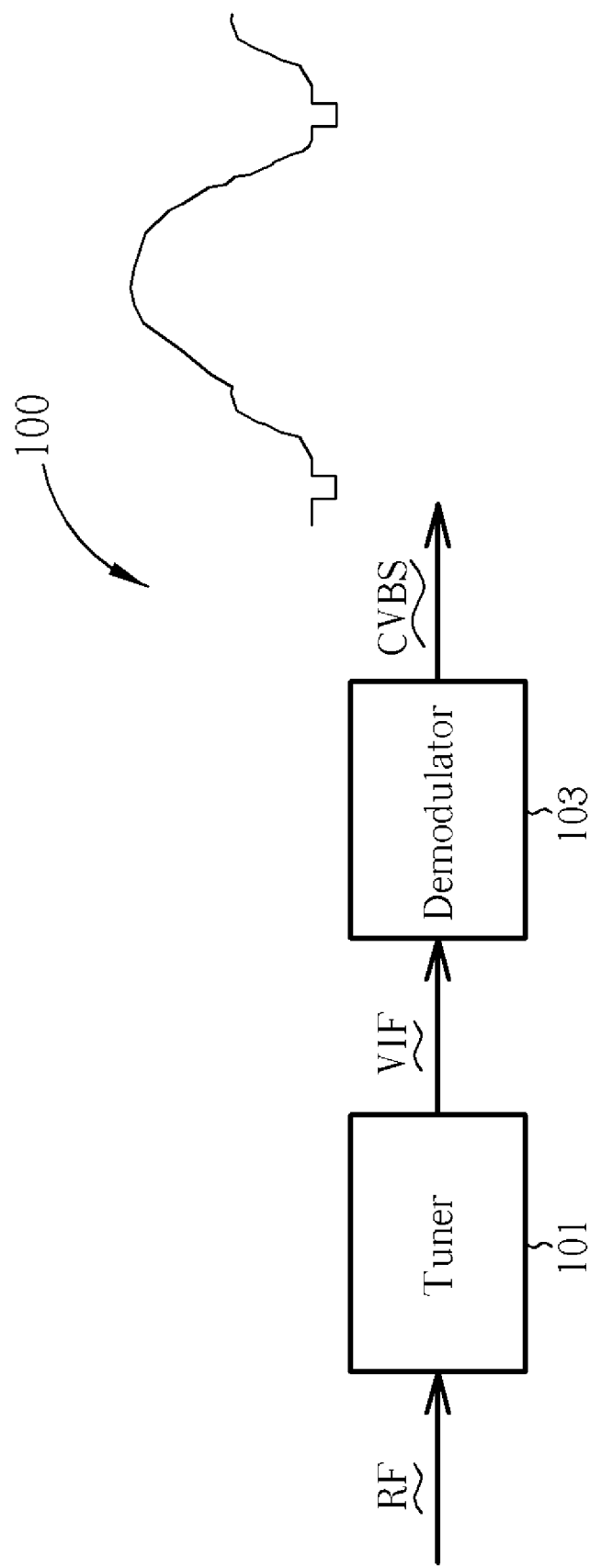
FIG. 1 is a block diagram of a front-end module of a prior art video system.
Figure 2:
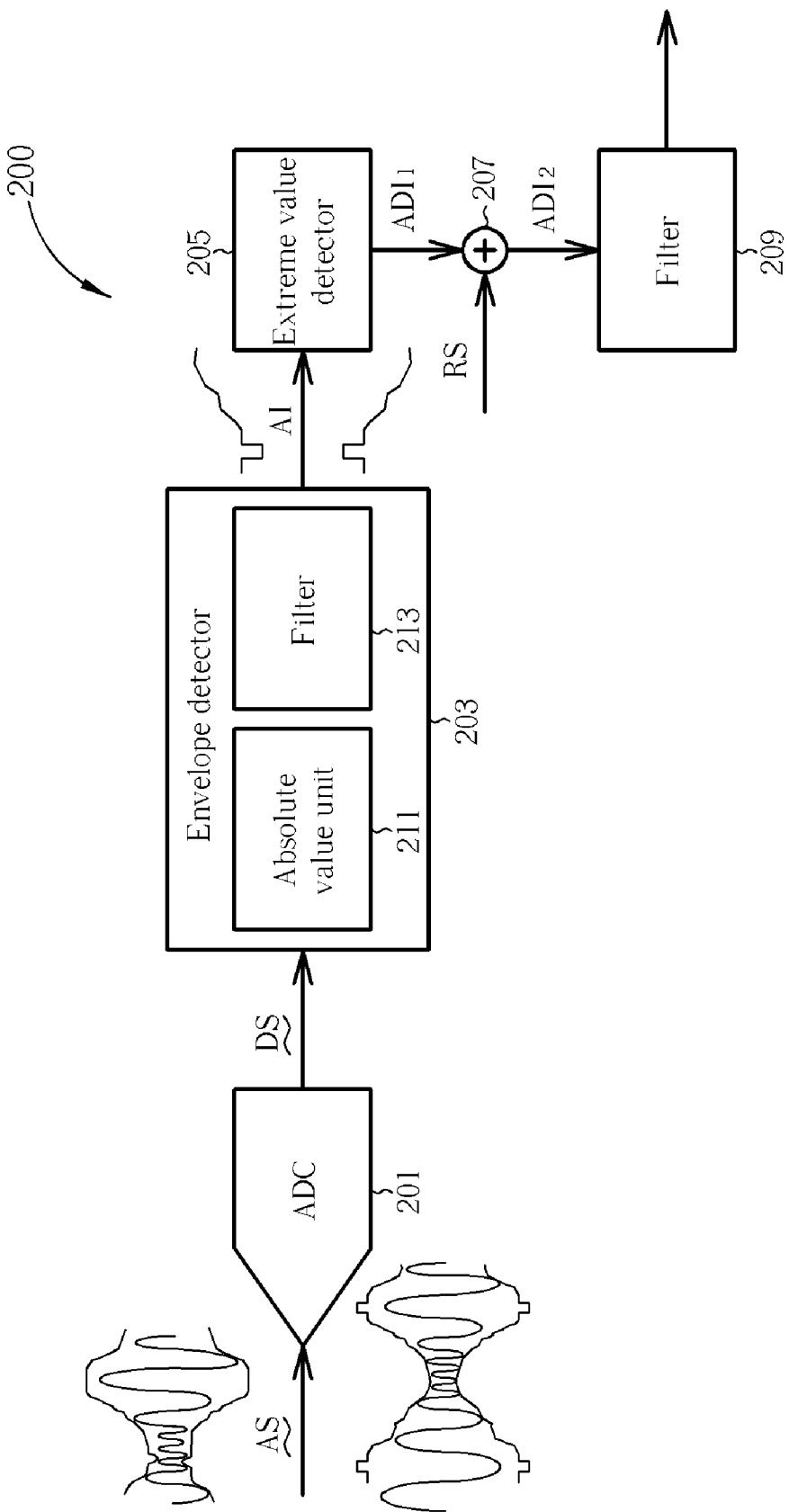
FIG. 2 is a block diagram illustrating an automatic video gain control circuit according to a first embodiment of the present invention.

FIG. 2 is a block diagram illustrating an automatic video gain control circuit 200 according to a first embodiment of the present invention, including an ADC 201, an envelope detector 203, an extreme value detector 205, an operation unit 207 and a filter 209.

The ADC 201 converts a modulated IF video signal AS to a digital video signal DS. The envelope detector 203 detects an envelope of the digital video signal DS to generate a baseband amplitude signal AI. The extreme value detector 205 detects an extreme value as a first adjusting information $ADI_1$ according to the baseband amplitude signal AI. The extreme value can be a maximum value or a minimum value of the first adjusting information $ADI_1$. Preferably, the extreme value detector 205 detects a minimum value of the baseband amplitude signal AI if the modulated IF video signal AS is positively modulated, and the extreme value detector 205 detects a maximum value of the baseband amplitude signal AI if the modulated IF video signal AS is negatively modulated. The extreme value detector 205 detects the extreme value information of the baseband amplitude signal AI to roughly obtain the wave shape of the baseband amplitude signal AI. The gain control can be speeded up according to the extreme value information in the early receiving period of signal gain control for some worse signal, such as too large or too small signals. In this embodiment, the first adjusting information $ADI_1$ can be directly utilized for adjusting video gain controlling. Alternatively, the operation unit 207, such as an adder, operates the first adjusting information $ADI_1$ and the reference value RS to generate the second adjusting information $ADI_2$ for adjusting the video gain. Further, another filter 209 filters the second adjusting information $ADI_2$ for controlling the gain of a tuner (not shown). The structure according to the present embodiment can be utilized for the modulated IF video signal AS modulated positively or negatively, such that the gain can be controlled and will not be affected by the video content.

For example, the envelope detector 203 comprises an absolute value unit 211 and a filter 213, and the video signal x (t) can be expressed as x(t)*cos (ωt), wherein w indicates carrier frequency and t indicates time. For a video signal x(t), x(t) is a positive signal. The absolute value unit 211 generates an absolute video signal according to the digital video signal DS to obtain the demodulated wave for a positive region. The filter 213 filters the absolute video signal to obtain a sketchy baseband amplitude signal AI. The filter 213 can be a digital finite impulse response (FIR) filter or a cascaded integrator-comb (CIC) filter to down-sample the digital signal DS. In this embodiment, the CIC filter can have a down-sampling rate M=80, i.e. one sampling point every 80 points, and a register length L=2. By down-sampling, the data amount of the step for processing the modulated IF video signal AS to obtain the baseband amplitude signal AI can be decreased and the processing speed can be increased. Therefore, the tuner gain can be controlled quickly according to the sketch baseband amplitude signal AI.

In order to prevent some worse cases in the signal process, for example, some over-modulated signals are broadcast by a nonstandard broadcasting station so the lowest points are less than 0. The minimum value obtained via absolute processing is a value close to, but not a correct lowest point of the original synchronization signal. Preferably, if the minimum value point is obtained, a sampling value at a neighboring point by right or left shifting a predetermined distance can be utilized for gain control, such that the level of a front porch or back porch can be utilized for gain control to prevent possible error due to the destructed synchronization signal.

Figure 3:
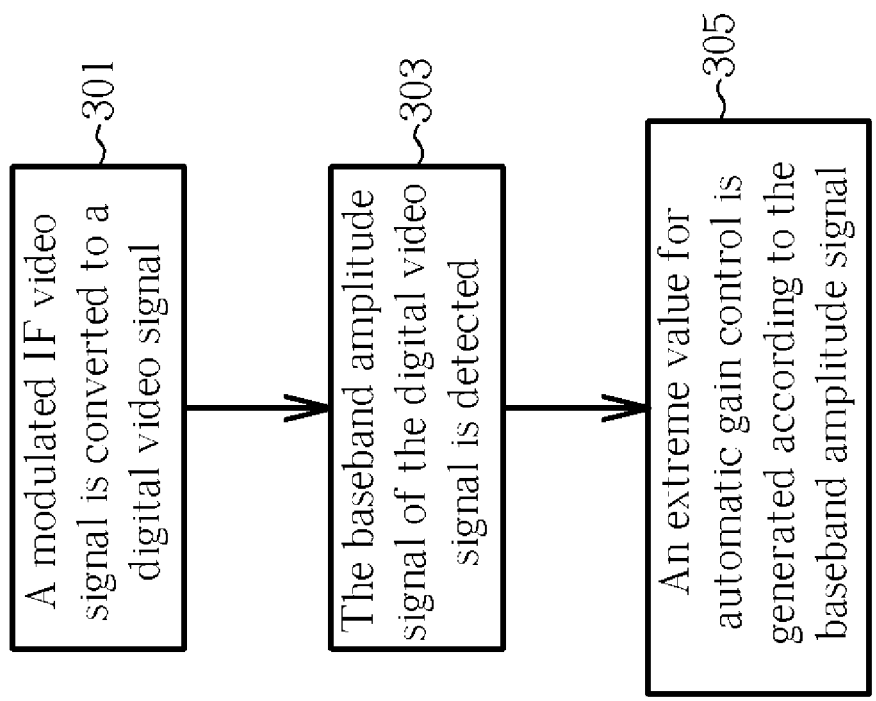
FIG. 3 is a flow chart illustrating an automatic video gain control method utilized in the automatic video gain control circuit shown in FIG. 2.

FIG. 3 is a flow chart illustrating an automatic video gain control method utilized in the automatic video gain control circuit shown in FIG. 2. In step 301, a modulated IF video signal is converted to a digital video signal. In step 303, the baseband amplitude signal of the digital video signal is detected. In step 305, an extreme value for automatic gain control is generated according to the baseband amplitude signal. Preferably, a value at a front porch or a back porch is found according to the minimum value position for a positively modulated video signal, for example, by shifting a predetermined sampling points from the minimum value position, in order to control RF gain.

Figure 4:
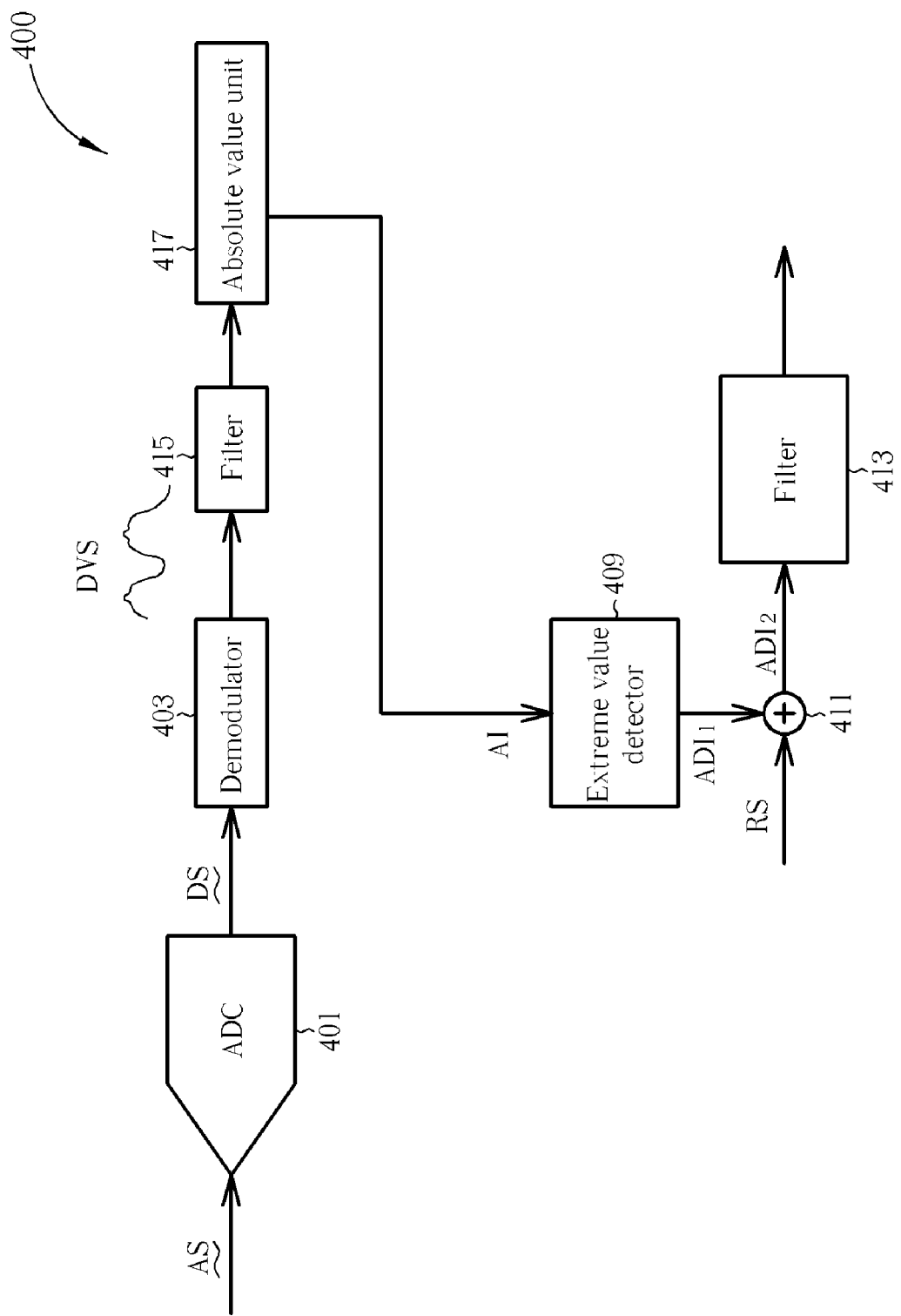
FIG. 4 is a block diagram illustrating an automatic video gain control circuit according to a second embodiment of the present invention.

FIG. 4 is a block diagram illustrating the automatic video gain control circuit 400 according to a second embodiment of the present invention. The ADC 401 digitizes the positively modulated IF video signal AS to a digital video signal DS, and the demodulator generates a demodulated signal DVS. The data amount are reduced and the processing speed increases if the demodulated signal DVS is down-sampled by the filter 415. In this way, a sketch baseband amplitude signal can be obtained while an accurate wave shape of the baseband amplitude signal is not necessary for RF gain control. Theoretically, the demodulated signal DVS is a positive signal, but a low frequency modulated wave shape $x(t)*\cos(\omega_{low}t)$ carried by a low frequency carrier will occur on the baseband amplitude signal before the demodulated signal DVS converges during demodulation process, wherein $\omega_{low}$ indicates a low frequency carrier frequency and t indicates time. Therefore, the demodulated signal DVS is processed by the absolute unit 417 to ensure a positive signal. The output of the absolute value unit 417 is processed by the extreme value detector 409 to detect the maximum value of the baseband amplitude signal AI, and the first adjusting information $ADI_1$ operates with a reference value RS by the operation unit 411, e.g. an adder, to generate a second adjusting information $ADI_2$ for adjusting video gain. A filter 413 can be further included to filter the second adjusting information $ADI_2$ to control gain of a tuner (not shown).

Figure 5:
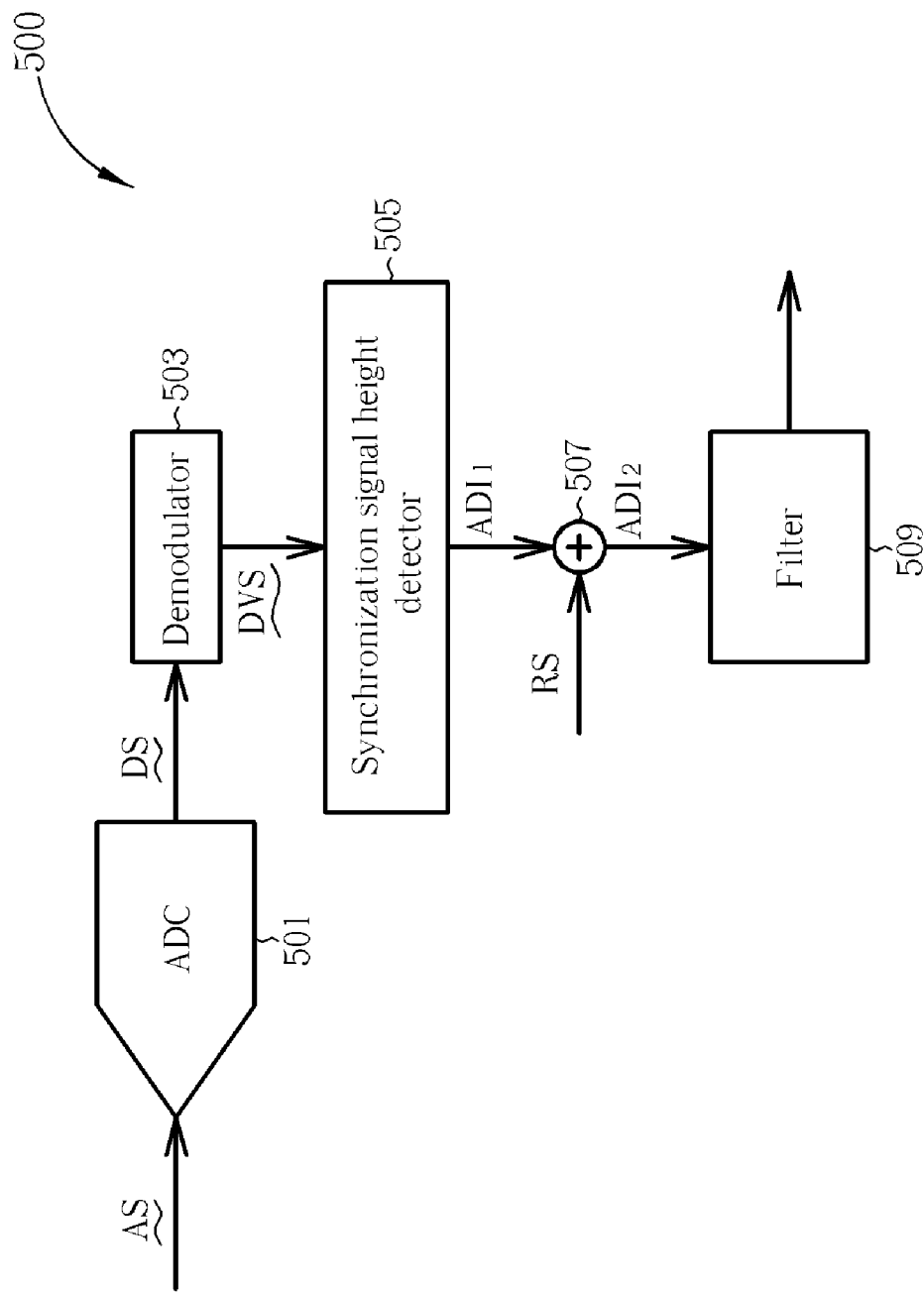
FIG. 5 is a block diagram illustrating an automatic video gain control circuit according to a third embodiment of the present invention.

FIG. 5 is a block diagram illustrating the automatic video gain control circuit 500 according to a third embodiment of the present invention, which detects a height of the synchronization signal to control gain of the tuner (not shown). The ADC 501 transfers an IF video signal AS to a digital video signal DS. The demodulator 503 demodulates the digital video signal DS to generate a demodulated digital video signal DVS. The synchronization height detector 505 detects the height of the demodulated digital video signal DVS to generate height information h as a first adjusting information $ADI_1$. Alternatively, the operation unit 507, e.g. an adder, operates the first adjusting information $ADI_1$ and the reference value RS to generate a second adjusting information $ADI_2$ for adjusting the video gain. Further, another filter 509 filters the second adjusting information $ADI_2$ to control the gain of the tuner (not shown). Preferably, the synchronization height detector 505 can be implemented in a back-end video decoder. The video signal becomes relatively stable after the signal converges. The height information h can be applied in the above embodiment. Thus, the size of an RF signal can be effectively adjusted according to the height information h. For example, the synchronization height detector detects the height difference between the lowest voltage and the back porch of the demodulated digital video signal DVS to generate the height information h, such that the gain of positively-modulated video signal can be adjusted to meet France SECAM standard.

Figure 6:
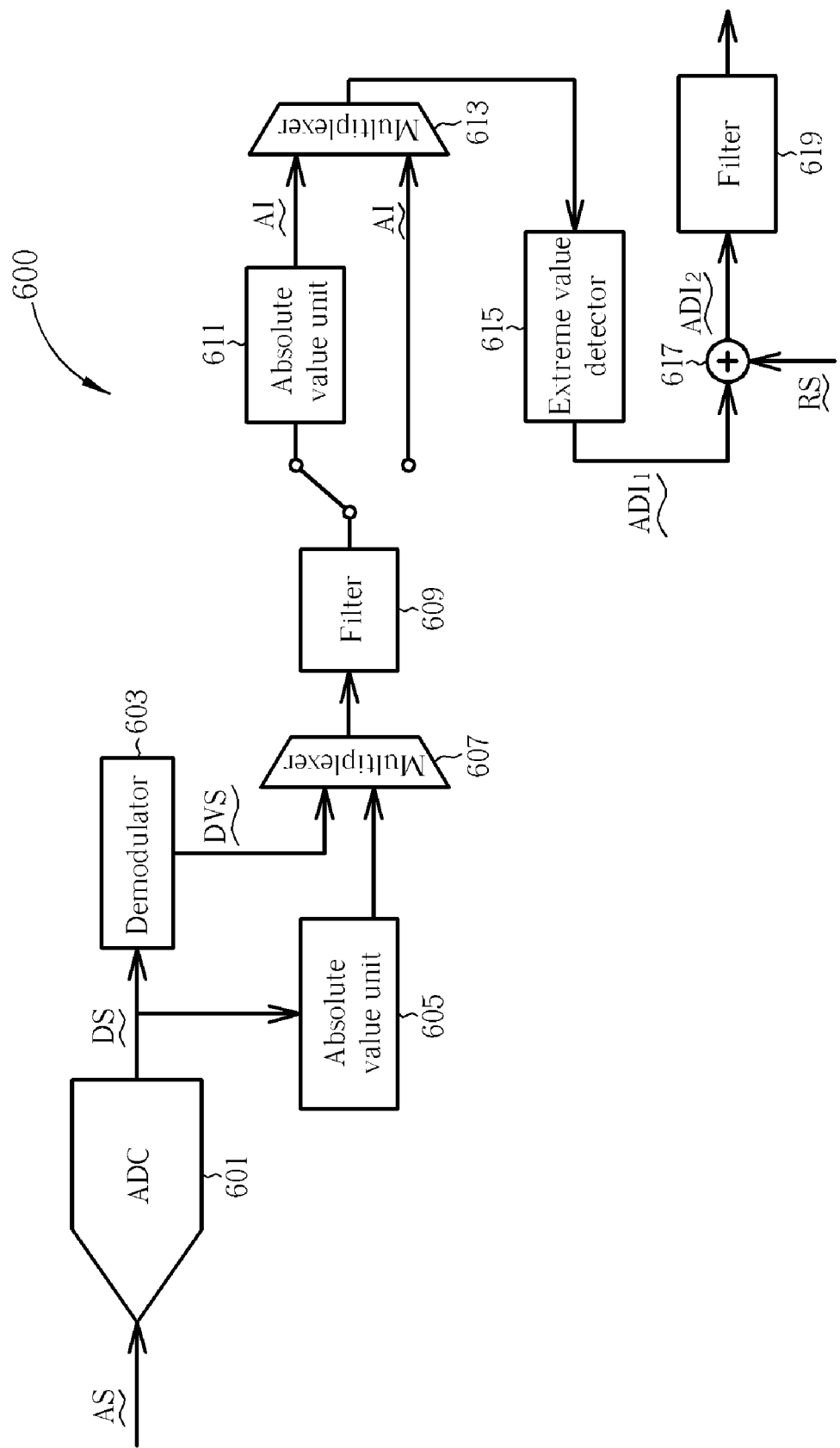
FIG. 6 is a block diagram illustrating a circuit, which is an integration of the embodiments shown in FIGS. 2 and 4.

FIG. 6 is a block diagram illustrating a circuit integrating the embodiments shown in FIG. 2 and FIG. 4. The automatic video gain control circuit 600 comprises an ADC 601, a demodulator 603, an absolute units 605, 611, a multiplexer 607, a filter 609, a multiplexer 613, an extreme detector 615, an operation unit 617 and a filter 619. The ADC 601 transfers an IF video signal AS to a digital video signal DS. The absolute unit 605 and the filter 609, or the absolute unit 611 and the filter 609, e.g. an envelope detector, generate a baseband amplitude signal AI according to the digital video signal DS. The extreme value detector 615 generates the extreme value information as first adjusting information $ADI_1$ according to the baseband amplitude signal.

For example, the first adjusting information $ADI_1$ can be directly applied to adjust the video system. Alternatively, the operation unit 607, e.g. an adder, operates the first adjusting information $ADI_1$ and the reference value RS to generate the second adjusting information $ADI_2$ for adjusting the video gain. Another filter 619 can further filter the second adjusting information $ADI_2$. The filter 609, down-sampling an absolute video signal or a demodulated video signal, can be an FIR filter or a CIC filter. For example, the CIC filter has a down-sampling rate M=80, i.e. keeping only one point out of every 80 samples, and a register length L=2, so as to down-sample the digital data and speed up the hardware processing.

The multiplexers 607 and 613 switch paths properly. For example, when starting signal receiving, the de-modulator may not demodulate an acceptable demodulated signal. The gain of an RF signal requires adjustment, so the path is switched to the ADC 601, the absolute value unit 605, the multiplexer 607 and the filter 609. A sketchy baseband amplitude signal is generated according to the modulated IF video signal AS for adjusting the RF gain. The demodulator 603 can generate a distinguishable demodulated signal when the signal converges. But the signal quality needs to be further improved. Preferably, if the demodulated video signal is negatively modulated, the multiplexer 607 is switched to a path via the filter 609 and the absolute value unit 611, in order to generate the baseband amplitude signal AI.

Figure 7:
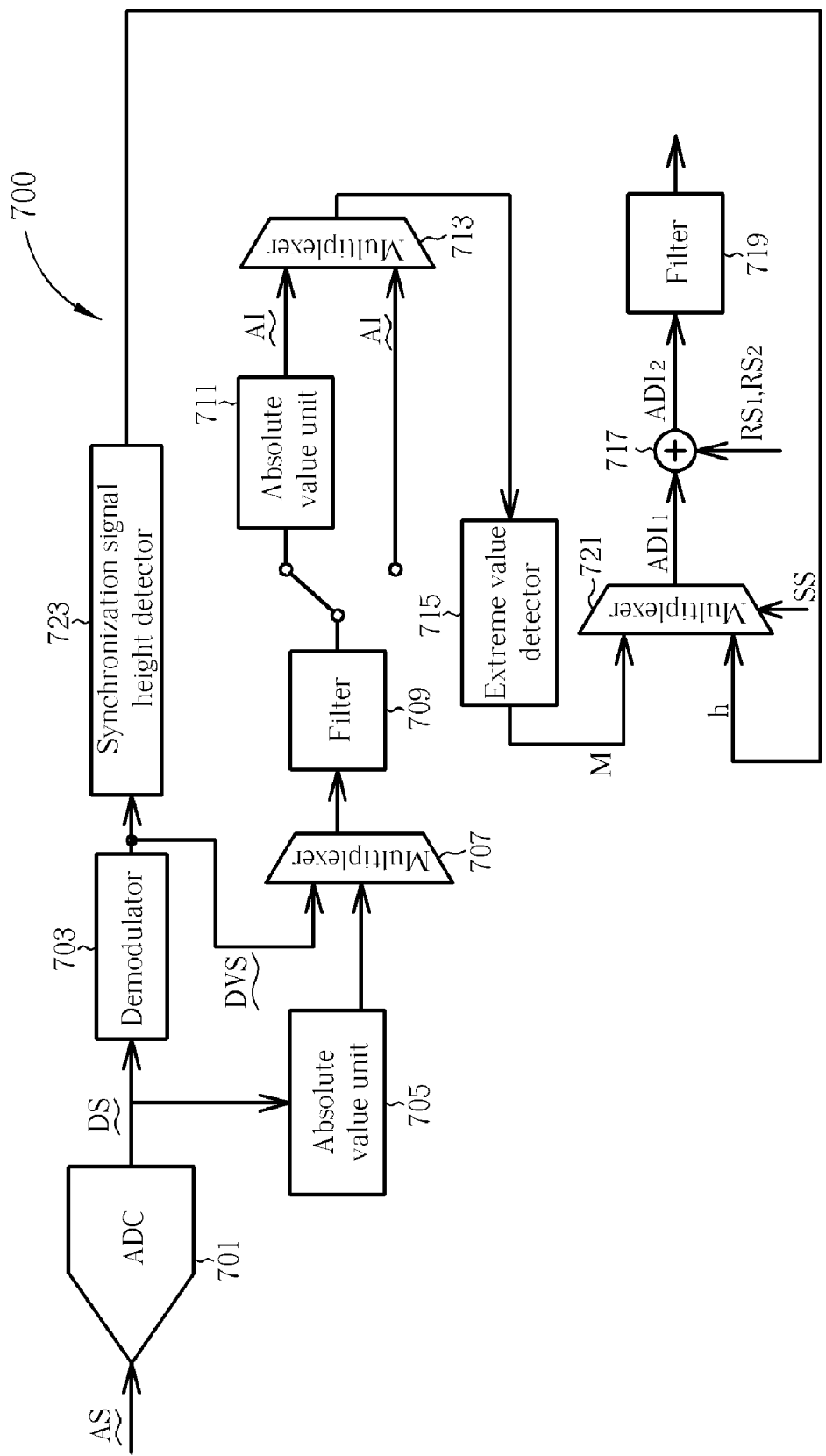
FIG. 7 is a block diagram illustrating a circuit, which is an integration of the embodiments shown in FIGS. 2, 4 and 6.

FIG. 7 is a block diagram illustrating a circuit integrating the embodiments shown in FIGS. 2, 4 and 6. The automatic video gain control circuit 700 includes an ADC 701, a demodulator 703, absolute value units 705, 711, a filter 709, multiplexers 707, 713, 721, an extreme value detector 715, an operation unit 717 and a filter 719. The modulated IF video signal AS is noisy. When starting receiving, the modulated IF video signal AS is processed via the ADC 701, the absolute value unit 705, and the filter 709 by controlling the multiplexers 707 and 713 to generate a sketch baseband amplitude signal AI, and the extreme value detector 715 generates the extreme value M. Preferably, for positive modulation of the modulated IF video signal, the extreme value detector 715 detects a minimum value of the baseband amplitude signal AI. For negative modulation of the modulated IF video signal, the extreme value detector 715 detects a maximum value of the baseband amplitude signal AI. Alternatively, after the minimum value point of the sketch baseband amplitude signal is obtained, the sampling value at a point by right or left shifting a predetermined distance is utilized for gain control. By this way, RF gain can be effectively adjusted according to the modulated IF video signal AS.

Preferably, the path of the multiplexer 707, 713 can be controlled for a negatively-modulated video signal, thereby RF gain of the demodulated video signal DVS processed by the demodulator 703 can be adjusted. The demodulated video signal DVS can be down-sampled by the filter 709 so as to decrease data amount for processing. The demodulated video signal DVS passes through the absolute value unit 711 to ensure it is positive, and the extreme value detector 715 detects the maximum value. Alternatively, after the signal converges, for both of positive modulation and negative modulation, the multiplexer 721 is controlled to output a height information h, detected by the synchronization height detector 723, for RF gain control. After the signal converges, the demodulator 703 can demodulate better and better, and the wave size of the converged signal can be controlled by the synchronization signal height to control RF gain accurately. The multiplexer 721 outputs the extreme value M or height information h as the first adjusting information $ADI_1$ according to the selecting signal SS, e.g. controlled by a micro controller 8051. In this embodiment, the first adjusting information $ADI_1$ can be directly utilized for video gain control. Alternatively, the operation unit 717, e.g. an adder, operates the first adjusting information $ADI_1$, reference value $RS_1$ or $RS_2$ to generate the second adjusting information $ADI_2$ for adjusting the RF gain. The first reference value $RS_1$ is the reference value of the extreme value information M, and the second reference value $RS_2$ is the reference value of the height information h. Preferably, the filter 719 can be included to filter the second adjusting information $ADI_2$ for automatic RF gain control. Preferably, the height detector 723 can be implemented in a back-end video decoder (not shown). The hardware structure according to the present embodiment can be applied to the positively or negatively modulated IF video signal AS, to control tuner gain without being affected by video content. Modulated IF video signal AS can be utilized to adjust the gain for early signal receiving for fast convergence. The final signal quality can become perfect with associated mechanism.

Figure 8:
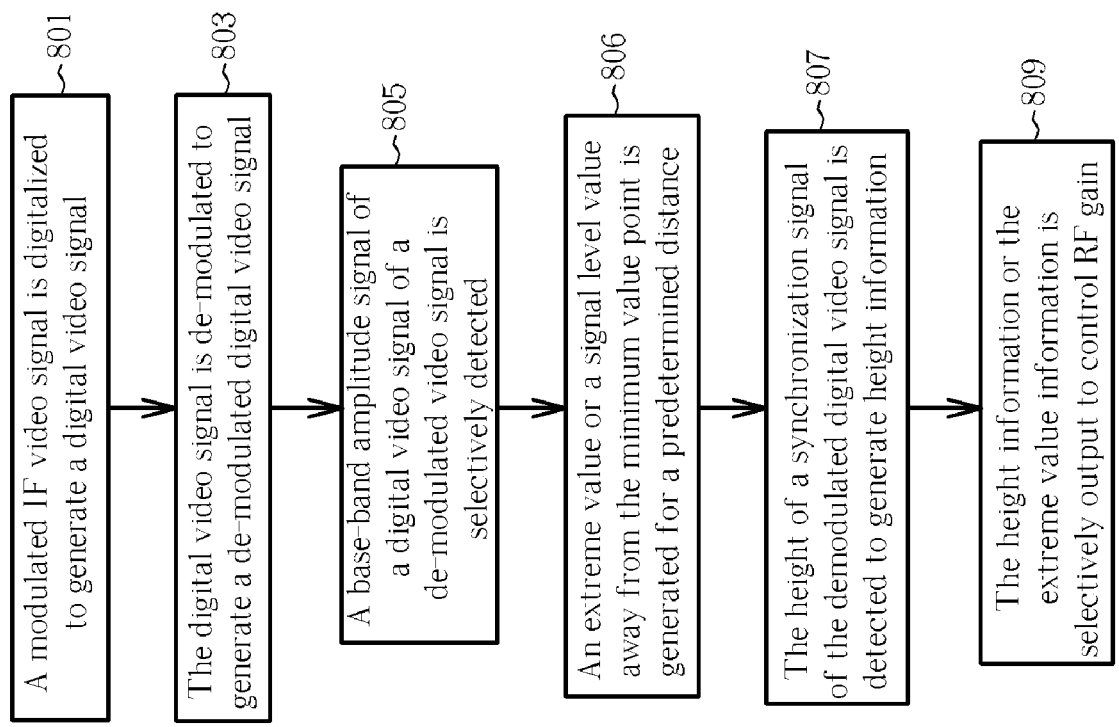
FIG. 8 is a flow chart illustrating an automatic video gain control method according to an embodiment of the present invention.

FIG. 8 is a flow chart illustrating an automatic video gain control method according to an embodiment of the present invention. In step 801, a modulated IF video signal is digitized to generate a digital video signal. In step 803, the digital video signal is de-modulated to generate a de-modulated digital video signal. In step 805, a baseband amplitude signal of the digital video signal or the de-modulated digital video signal is selectively detected. In step 806, an extreme value or a signal level value at a predetermined distance away from the minimum value point is generated. In step 807, a height of a synchronization signal of the demodulated digital video signal is detected to generate height information. In step 809, the height information or the extreme value information is selectively output to control RF gain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic video gain control circuit, comprising:
   an ADC, for converting a modulated IF video signal to a digital video signal;
   a demodulator, coupled to the ADC, for demodulating the digital video signal to generate a demodulated digital video signal;
   a synchronization signal height detector, coupled to the demodulator, for detecting a height information of a synchronization signal of the demodulated video signal;
   an envelope detector, coupled to the ADC, for generating a baseband amplitude signal according to the digital video signal;
   an extreme value detector, coupled to the envelope detector, for generating an extreme value information for automatic gain control according to the baseband amplitude signal; and
   a multiplexer, coupled to the extreme value detector and the synchronization signal height detector, for selectively outputting the height information or the extreme value information.

2. The automatic video gain control circuit of claim 1, wherein the extreme value detector detects a minimum value of the baseband amplitude signal if the modulated IF video signal is positively modulated, and the extreme value detector detects a maximum value of the baseband amplitude signal if the modulated IF video signal is negatively modulated.

3. The automatic video gain control circuit of claim 1, further comprising an operation unit, coupled to the extreme value detector, for receiving a reference value and the extreme value information, and for generating an adjusting information for automatic gain control according to the reference value and the extreme value information.

4. The automatic video gain control circuit of claim 3, further comprising a filter, coupled to the operation unit, for filtering the adjusting information.

5. The automatic video gain control circuit of claim 1, wherein the extreme value detector detects a minimum value of the baseband amplitude signal if the modulated IF video signal is positively modulated, and the automatic video gain control circuit performs automatic gain control according to a level value at a predetermined distance away from the minimum value position.

6. The automatic video gain control circuit of claim 1, wherein the envelope detector comprises:
an absolute value unit; and
a filter, coupled to the absolute value unit;
wherein the absolute unit generates an absolute video signal according to the digital video signal and the filter filters the absolute video signal to generate the baseband amplitude signal.

7. The automatic video gain control circuit of claim 6, wherein the filter is a digital finite impulse response (FIR) filter.

8. The automatic video gain control circuit of claim 6, wherein the filter is a cascaded integrator-comb (CIC) filter.

9. The automatic video gain control circuit of claim 1, wherein the extreme value information from the extreme value detector comprises a maximum value and a minimum value.

10. The automatic video gain control circuit of claim 1, wherein the synchronization signal height detector is directly coupled to an output of the demodulator for detecting the height information of the synchronization signal of the demodulated video signal.

11. An automatic video gain control circuit, comprising:
an ADC, for converting a modulated IF video signal to a digital video signal;
a demodulator, coupled to the ADC, for demodulating the digital video signal to generate a de-modulated digital video signal;
a first multiplexer, coupled to the demodulator and the ADC, for selectively outputting the digital video signal or the demodulated digital video signal;
an envelope detector, coupled to the first multiplexer, for generating a baseband amplitude signal; and
an extreme value detector, coupled to the envelope detector, for generating an extreme value for automatic gain control according to the baseband amplitude signal.

12. The automatic video gain control circuit of claim 11, further comprising:
a second multiplexer, coupled to the extreme value detector, for receiving a height information of a synchronization signal to selectively output the height information of the synchronization signal or the extreme value information.

13. The automatic video gain control circuit of claim 11, wherein the first multiplexer is directly coupled to the output of the demodulator.

14. An automatic video gain control method for positive modulation and negative modulation, comprising:
converting a modulated IF video signal to a digital video signal;
demodulating the digital video signal to generate a demodulated digital video signal;
generating a baseband amplitude signal according to one of the digital video signal and the demodulated digital video signal selected with a multiplexer; and
generating an extreme value information for automatic gain control according to the baseband amplitude signal.

15. The automatic video gain control method of claim 14, wherein the steps of generating the baseband amplitude signal produces an absolute video signal according to the digital video signal and filters the absolute video signal to generate the baseband amplitude signal.

16. The automatic video gain control method of claim 14, wherein the extreme value information is a minimum value of the baseband amplitude signal if the modulated IF video signal is positively modulated, and the extreme value information is a maximum value of the baseband amplitude signal if the modulated IF video signal is negatively modulated.

17. The automatic video gain control method of claim 14, wherein the extreme value information is a minimum value of the baseband amplitude signal if the modulated IF video signal is positively modulated, and automatic gain control is performed according to a level value at a predetermined distance away from the minimum value position.

18. The automatic video gain control method of claim 14, further comprising:
demodulating the digital video signal to generate a demodulated digital video signal;
detecting a height information of a synchronization signal of the demodulated video signal; and
selectively outputting the height information or the extreme value information for automatic gain control.

19. The automatic video gain control method of claim 14, further comprising:
detecting a height information of a synchronization signal of the demodulated video data;
wherein the automatic gain control method is performed according to alternative of the height information and the extreme value information.

20. The automatic video gain control method of claim 14, further comprising:
demodulating the digital video signal to generate a demodulated digital video signal;
wherein the steps of generating the baseband amplitude signal generate the baseband amplitude signal by detecting amplitude of the demodulated digital video signal.

* * * * *